Patented Jan. 22, 1929.

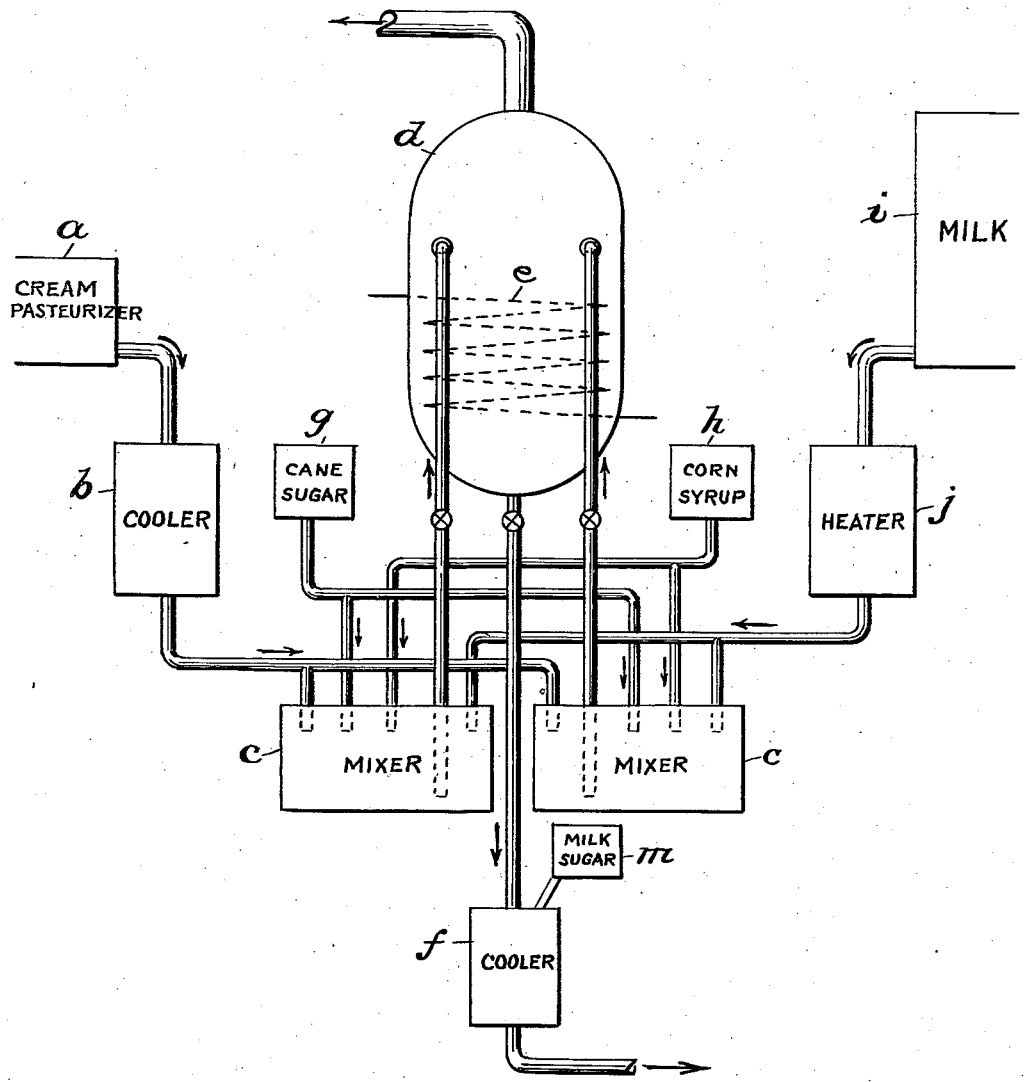

1,699,526

UNITED STATES PATENT OFFICE.

DEAN W. FISHER, OF SPRINGFIELD, MASSACHUSETTS, ASSIGNOR TO GENERAL ICE CREAM CORPORATION, OF SCHENECTADY, NEW YORK, A CORPORATION OF NEW YORK.

PROCESS OF MAKING CONCENTRATED ICE-CREAM MIX.

Application filed July 24, 1924. Serial No. 727,889.

The object of my invention is to produce a concentrated ice cream mix which has substantial advantages over the ordinary mix prepared by known processes.

Ice cream is a highly nutritious food, but is rarely uniform in quality and composition, and it is extremely difficult to guard against all the factors that tend to make it unfit for human consumption. Deterioration of the mix, or of the ice cream made therefrom, may be due to the multiplication of harmful organisms contained in the original milk or cream or to contamination from without. Such deterioration may merely affect the taste of the frozen product, but ice cream that has undergone putrefaction is always dangerous to health and in many instances its consumption has had fatal results. The poisonous chemical substances produced by bacteria may be products of decomposition of the food in which the bacteria is growing, ptomaines and some other bodies being produced in this way; or they may be soluble poisons synthetically produced by the bacterial cells and secreted by them into the surrounding media, the true toxins being produced in this way; or they be poisons produced synthetically by the bacteria which are not secreted outside the cell walls, these poisons being specific substances.

Where unsweetened milk products and milk products of low concentration are used in compounding the ice cream mix, there is no effective protection against these bacterial changes.

The principal object of my invention is to prepare an ice cream mix by a process that will give a high percentage of sugar concentration and a low percentage of moisture and give conditions that will prevent, or at least greatly minimize, the bacterial development or cell functioning, above described.

Another object of my invention is to prepare an ice cream mix by a process which, while it will guard against bacterial or other microbal changes and kill all pathogenic and non-sporebearing organisms, will not destroy the health giving enzymes in the natural milk products.

Another object of the invention is to produce an ice cream mix that will be of uniform quality and composition, and that will retain all the original flavors of the milk and not be susceptible to the absorption of foul odors.

Cream and milk, or a mixture thereof with other ingredients, or the finished frozen product, can be preserved for only a limited time and then only at the risk of serious deterioration; and transportation for long distances is therefore not feasible, while transportation for any distance, as well as its handling and storage, are expensive because of the bulk of the ingredients.

Another object of my invention is to produce an ice cream mix that can be preserved for a substantial length of time in healthful condition and that will be so concentrated that it will occupy a much smaller bulk than the finished product. This renders it practicable to store and handle the mix economically and to transport it to relatively great distances, with the obvious advantages that localities which have no adequate neighboring source of supply can be supplied, at minimum expense, with the ingredients required for the manufacture of ice cream from relatively distant sources where the supply is plentiful. Further, the mix may be made in seasons of high milk yield and consumed in seasons of low milk yield.

It is obvious, also, that with the use of an ice cream mix having the above advantages, the loss by spoilage, which is now considerable, will be reduced to a minimum.

Before describing my process, it may be stated that my improved mix may contain somewhat varying proportions of fat, solids not fat and cane (or beet) sugar; but a product containing 24% fat, 21% solids not fat and 32% sugar, giving 77% total solids, is an example of a highly desirable mix that may be produced by my process.

As an illustration of the ingredients used in the production of the finished mix, it may be assumed that we start with the following ingredients of the mix, taking as a unit 1000 pounds of milk testing 3.6% butter fat and 8.58% solids not fat; that we add thereto (as hereinafter set out) 226.1 pounds of cream testing 40% fat and 5.4% solids not fat, 50.57 pounds of corn syrup containing 50% sugar and 25% other solids, and 143.3 pounds of cane sugar. The quantities of the several ingredients, with the contained solids, may therefore be tabulated as follows:

| | Pounds. | | |
|---|---|---|---|
| | Fat. | S. N. F. | Sugar. |
| 1000 pounds milk | 36 | 85.8 | |
| 226.1 pounds cream | 90.44 | 12.21 | |
| 50.57 pounds corn syrup | | 12.64 | 25.28 |
| 143.3 pounds cane sugar | | | 143.3 |
| 1419.97 all raw products | 126.44 | 110.65 | 168.58 |

The total solids therefore amount to 405.67 pounds and the total water content 1014.3 pounds. With a final concentration in the finished mix of 77%, the desired weight of the finished mix may be readily calculated: 405.67 divided by .77 gives 526.84 pounds — the weight of the finished mix.

There must therefore be expelled from the raw products (1419.97 pounds) 893.13 pounds of water, leaving 121.17 pounds of water (1014.3 minus 893.13) in the finished mix. This will give a finished mix of the following constituents.

| | Pounds. | Per cent. |
|---|---|---|
| Fat | 126.44 | 24 |
| Solids not fat | 110.65 | 21 |
| Sugar | 168.58 | 32 |
| Water | 121.17 | 23 |
| | 526.84 | 100 |

The 23% water and the 32% sugar in the finished mix give a total of 55%. The sugar concentration (32 divided by 55) is therefore 58.18%.

A preferred example of my improved process is as follows:

Fresh cream is put into a pasteurizing vat, where it is heated to a temperature of about 145 degrees F. and held at this temperature for about one-half hour. It is then cooled rather rapidly to about 50 degrees F. or less. It is then immediately put into cold storage, where it is held at a temperature from 30–32 degrees F. until used.

The milk used is delivered fresh and is immediately cooled to 50 degrees F. or below for the purpose of checking bacterial action. The milk, before entering the vacuum pan, passes through a continuous pasteurizer and is heated to about 180 degrees F. The cane sugar and corn syrup may be immediately added to this hot milk. After the sugar and syrup are thoroughly dissolved, the pasteurized cream is added. If the temperature drops below 145 degrees F. it would be wise to inject steam into the mixture and hold at the above temperature until the mixture is drawn into the pan.

At the end of about one-half hour, the mixture is drawn into a vacuum pan, which is an air-tight chamber wherein a rather high vacuum has been produced. A satisfactory degree of vacuum is one in which the boiling point of the mixture is about 130° F. In this pan the mixture is condensed until the proper density has been obtained. The concentrated mix is then drawn off into cooling vats where it is cooled to a temperature of about 60 degrees F. This cooling process is effected by water passing through revolving coils within the mix. If the milk is heated in the wells, or by any other holding method, the temperature may vary from 145 degrees F. to 210 degrees F.

The manner of cooling may be effected by the mix passing through coils which are surrounded by the cooling medium. The length of time occupied in cooling will depend upon the process employed.

The mix is then drawn off into clean containers and placed in cold storage.

The elements of the apparatus that I prefer to use are old and well known, and in order to carry out my process, no description of the construction of these elements is necessary to enable those skilled in the art to practice the process. Indeed, those practicing the process will prefer apparatus of their own designing or selection. The accompanying drawing therefore represents only a diagram of a complete plant.

The cream is pasteurized in the pasteurizing vat $a$ and cooled in the cooler $b$. It may be run therefrom directly into one of the continuous milk pasteurizers $c$, although it will usually be held in cold storage for a time, as hereinbefore stated. The milk from storage tank $i$ is heated in heater $j$ and then introduced into one of the mixing tanks $c$; or the entire pasteurizing operation may take place in tank $c$. Into the tank $c$ is also introduced, in addition to the pasteurized cream, the cane sugar (say from vessel $g$) and corn syrup (say from vessel $h$), as hereinbefore described. When a partial vacuum is created in the vacuum pan $d$, the mix in tank $c$ is drawn thereinto. $e$ is a steam coil in the vacuum pan, which may also be steam-jacketed. The condensed mix is then conveyed to a cooler $f$, through the coils of which cold water is circulated. From the cooler, the mix is drawn off into containers and stored, as described.

While I have given a quite specific example of the practice of my process, involving definite times and temperatures, it will be understood that these factors are subject to considerable variations within ranges more or less wide.

Thus, in the pasteurization of the cream, it may be heated to as low as 140° F., although a reduction in this temperature involves a longer duration of heating. On the other hand, the cream may be less desirably pasteurized by the flash heat system, which involves heating to about 170° or even as high as 180° and instantly, or very quickly, cooling.

Again, in the pasteurization of the milk, the temperature range may be the same as that of the cream, although, with equal temperatures, the duration of heating is substantially greater with the milk than with the cream. In heating the milk, a close approximation to the highest part of the range specified, or about 180° F., is preferred. The temperature may be permissibly lower if the holding method is used. In the latter method, the temperature may vary from 140° F. to 210° F.

It is permissible, but undesirable, to add the cream and corn syrup to the milk before heating or while it is being heated, but it is preferable not to add these ingredients until after the milk has been heated to within the pasteurizing range, say immediately after the milk has reached its maximum temperature. The cane sugar must not be added until after the milk has been heated, unless it is first made into a syrup. The cream, cane sugar and corn syrup, or any two of these ingredients, may be mixed together before adding to the milk; but there is no advantage in so doing, and it is preferred to add the ingredients separately.

It is often desirable, especially if the cream is to be preserved a considerable time before being made into the mix, to add a certain proportion of sugar to the cream while it is being pasteurized; the remainder of the sugar being added to the milk at the stage stated.

It is aimed to bring about as rapid evaporation as possible when conducive to quality of product. There are certain factors which enter into the process of partial dehydration: namely, steam pressure in the jacket and coils, and in the amount and temperature of the water used in the condenser. With an unlimited cold (about 50° F. or below) water supply, condensing with as high as twenty to twenty-five pounds of steam pressure in the jacket and coils would result in the maximum rate of evaporation consistent with good finished product. If the condenser is forced beyond its capacity, by using excessive steam in jacket and coils, the vacuum drops, the temperature rises, and the process is retarded. The higher the vacuum, the more rapid the evaporation. A high steam pressure in jacket and coils will increase the rapidity of evaporation only as long as enough water passes through the condenser to maintain a high vacuum. When the steam pressure in jacket and coils reaches the point where the water in the condenser fails to promptly reduce the vapors, the vacuum drops, the temperature in the pan rises, and evaporation is retarded.

The steam pressure in the jacket and coils should be so regulated as to make it possible to maintain the maximum vacuum consistent with economic use of water; therefore, the number of inches of vacuum will vary according to the available water supply and to the temperature of same, and to some extent to altitude of plant.

The range of temperature for condensing may vary from 120° F. to 150° F., depending upon the conditions above enumerated.

Temperate water is circulated through the coil in cooler $f$, so as to reduce the temperature of the mix slowly. While it need not be cooled below about 70° F., there would be, if the cooling did not proceed further, some subsequent shrinkage in volume after packing, and therefore cooling to 60° F. or below is preferred.

To the cooler $f$ should be added a very small amount of milk sugar (say from receptacle $m$), not over a fraction of one per cent and preferably only about one-fiftieth of one per cent. The addition of this very small proportion of milk sugar limits the size to which the milk sugar crystallizes and insures a smooth and velvet-like ultimate frozen product.

In the manufacture of the frozen product, about 100% by weight of water is added to the mix and the mixture homogenized. Owing to the fact that my improved mix, as a consequence of its mode of manufacture, is comparatively free of lactic acid, homogenization should be under a more than normally high pressure.

An important characteristic of my improved product is that it should have a sugar concentration within a well defined range, say not outside of 54-65 per cent and preferably within the range of 58-62 per cent. Thus, in the example product hereinbefore given, the composition is:

```
                 Per cent.
Fat_____24
Solids not fat__21
Sugar_____32 } sugar concentration 58.18%
Water _____23
```

Example of mixes very rich in fat would be:

| | Per cent. | Per cent. | Per cent. | Per cent. |
|---|---|---|---|---|
| Fat | 28 | 28 | 28 | 28 |
| Solids not fat | 18 | 20 | 22 | 19 |
| Sugar | 32 | 32 | 30 | 29 |
| Water | 22 | 20 | 20 | 24 |

In the first three of these examples the sugar concentrations vary from 59.26% to 61.54%—all near the mean of the most desirable range. In the last example, the proportion of sugar is about the minimum, the concentration being 54.75%.

An example of a mix of about the lowest permissible fat content would be:

| | Per cent. |
|---|---|
| Fat | 10-16 |
| Solids not fat | 22 |
| Sugar | 35 |
| Water | 27 |

In the product, the sugar concentration would be 56.45%, or nearly as low as is practicable.

All these mixes are characterized by the fact that the fat content is at least 10% (preferably 22-26 per cent), that the sugar content is no less than the fat content and that the sugar concentration is between about 55 and 62 per cent. It may be repeated here that the permissible sugar concentration may be as high as (say) 65% and as low as (say) 54%; but the preferable range is between 58 and 62%.

The use of corn syrup in part substitution for the sugar is not for the purpose of adulteration or cheapening, but imparts to the frozen product a desirable flavor that it entirely lacks if dependence is placed wholly on the cane sugar for flavoring. In the example heretofore given, the proportion of corn syrup to the total sweetening ingredients is about 26%. The percentage should be within the range of 20 to 32%.

It is believed that an important result produced by my invention, and which accounts for the fact that thereby the dangerous cell functioning hereinbefore described is prevented, is due to the plasmolization of the bacterial cell. The protoplasm or living material of the bacterial cell usually fills the interior. Its outer layer, or that portion next inside the cell wall, is differentiated as a membrane known as the ectoplast. This ectoplast is one of the most important structures of cell from the standpoint of cell nutrition. In many bacterial cells it is a semipermeable membrane; that is, it will allow some substances in solution to pass through, but not others. It determines, in other words, what substances may enter and what may leave the protoplasm. When certain bacterial cells are placed in strong sugar solutions, the protoplasm shrinks, the ectoplast acting as an osmotic membrane. A cell showing shrunken protoplasm is said to be plasmolized.

It is believed that it is this cell plasmolization that is the condition which, in my improved mix, stops bacterial development.

The advantages of my invention may be recapitulated as follows:

The temperature to which the raw products are subjected suffices to kill all pathogenic and non-sporebearing organisms, but is not high enough to destroy the natural enzymes so essential to digestion and nutrition.

The mix is not susceptible to bacterial and other microbal changes.

The mix retains the original milk flavors and is not susceptible to the absorption of foul odors.

The mix may be made of uniform quality and composition, with the constituents in the proportions adapted to give the best possible nutritive value.

The mix produced has an exceptionally low bacterial content, which greatly adds to its purity.

All dangers of contamination resulting from the handling of unpreserved milk products are eliminated. There is no danger of contamination in handling the preserved product, as all the constituents are contained in one package and in the right proportion.

The mix is a highly preserved product, due to the high per cent of total solids, the low per cent of water, and the high per cent of sugar concentration. Due to its capacity to "keep," it may be stored for a considerable time and transportated to distant points.

There is no loss by spoilage, which alone effects a material saving.

Much storage room is saved, because the mix is so concentrated that it contains much food in small bulk, thus effecting a material saving in cost of refrigeration; and because of the small bulk, the cost of transportation is much reduced. The factors of economical handling and transportation are of obvious great value and importance.

Having now fully described my invention, what I claim and desire to protect by Letters Patent is:

1. The process of producing a concentrated ice cream mix from milk, cream and sugar, which comprises pasteurizing the cream, heating the milk to a pasteurizing temperature and adding thereto sugar and the pasteurized cream, condensing the emulsion of milk, cream and sugar in a partial vacuum at a reduced temperature until the major part of the water is expelled and then cooling the concentrated mix.

2. The process of producing a concentrated ice cream mix from milk, cream and sugar, which comprises heating the cream to a pasteurizing temperature and cooling, heating the milk to a pasteurizing temperature above that to which the cream was heated, adding sugar and the pasteurized cream to the milk while the same is subjected to said higher temperature, condensing the emulsion in a partial vacuum at a temperature below the pasteurizing temperature of the cream until the major part of the water has been expelled, and then cooling the concentrated mix.

3. The process of producing a concentrated ice cream mix from milk, cream and sugar, which comprises heating the cream to a temperature of about 145° F., cooling rapidly to not substantially above 50° F., storing it at a temperature substantially below 50° F., heating the milk to a pasteurizing temperature above that to which the cream was heated, adding sugar and the pasteurized cream, condensing the emulsion in a partial vacuum at a temperature of about 130° F. until a preponderating proportion of water is expelled, and cooling the concentrated mix to a temperature of not above about 60° F.

4. The process of producing a concentrated ice cream mix from milk, cream, sugar and corn syrup, which comprises pasteurizing the cream, heating the milk to a pasteurizing temperature and adding thereto sugar, corn syrup and the pasteurized cream, condensing the emulsion in a partial vacuum at a reduced temperature until the major part of the water is expelled, and then cooling the concentrated mix.

5. The process of producing a concentrated ice cream mix from milk, cream and sugar, which comprises pasteurizing the cream, heating the milk to a pasteurizing temperature and adding thereto sugar and the pasteurized cream, condensing the emulsion in a partial vacuum at a reduced temperature until the sugar concentration is raised to from 54 to 65 per cent and then cooling the concentrated mix.

6. The process of producing a concentrated ice cream mix from milk, cream and sugar, which comprises pasteurizing the cream, heating the milk to a pasteurizing temperature and adding thereto sugar and the pasteurized cream, condensing the emulsion in a partial vacuum at a reduced temperature until the sugar concentration is raised to from 58 to 62 per cent and then cooling the concentrated mix.

7. The process set forth in claim 1 in which part of the ultimate sugar content is added to the cream in the cream pasteurizing process.

8. The process of producing a concentrated ice cream mix from milk, cream and sugar, which comprises pasteurizing the cream, heating the milk to a pasteurizing temperature and adding thereto sugar and the pasteurized cream, condensing the emulsion of milk, cream and sugar in a partial vacuum at a reduced temperature until such major portion of the water is expelled as will reduce the proportion of water below that of the sugar, and then cooling the concentrated mix.

9. The process of producing a concentrated ice cream mix from milk, cream and sugar, which comprises pasteurizing the cream, heating the milk to a pasteurizing temperature and adding thereto sugar and the pasteurized cream, condensing the emulsion of milk, cream and sugar in a partial vacuum at a reduced temperature until the major part of the water is expelled, the amount of sugar added and the proportion of water expelled being sufficient to give a mix having a percentage of sugar not below that of the fat and a percentage of water substantially below that of the sugar, and then cooling the concentrated mix.

In testimony of which invention, I have hereunto set my hand, at North Bangor, N. Y., on this 18th day of July, 1924.

DEAN W. FISHER.